United States Patent [19]

MacLean, IV

[11] Patent Number: 5,771,778
[45] Date of Patent: Jun. 30, 1998

[54] MARKETING SYSTEM

[76] Inventor: John A. MacLean, IV, 380 N. Middle Rd., Belgium, Wis. 53004

[21] Appl. No.: 732,788

[22] Filed: Oct. 15, 1996

[51] Int. Cl.[6] ........................................................ A23L 1/18
[52] U.S. Cl. .......................... 99/323.6; 99/323.7; 99/484; 221/13; 221/24
[58] Field of Search ............................... 99/323.6, 323.7, 99/484; 222/50; 221/24, 9, 13

[56] References Cited

U.S. PATENT DOCUMENTS 5,117,407  5/1992  Vogel ........................................ 369/30
5,445,295  8/1995  Brown ...................................... 221/9 X
5,630,357  5/1997  Akiyama .............................. 99/323.7 X

*Primary Examiner*—Reginald L. Alexander
*Attorney, Agent, or Firm*—Wells, St. John, Roberts, Gregory & Matkin, P.S.

[57] ABSTRACT

A marketing apparatus comprising a housing having the appearance of an antique jukebox; a display supported by the housing; an aromator supported by the housing and selectively emitting an aroma; and a sensor supported by the housing and triggering the display in response to sensing presence of a person spaced apart from but proximate the housing.

20 Claims, 5 Drawing Sheets

MARKETING SYSTEM

FIELD OF THE INVENTION

The invention relates to marketing systems. The invention also relates to vending machines.

BACKGROUND OF THE INVENTION

Retail establishments, such as grocery stores, now charge suppliers of goods for shelf space. The cost of the shelf space typically varies depending on location within a store. Factors such as traffic patterns, shelf height, proximity to a store entrance or to cash registers, or other factors can be used by the retail establishment to set prices for retail space.

For many items, purchase decisions are made while the consumer is in the retail establishment. This is particularly true for goods that are purchased on impulse.

Further, many products are judged, at least to some extent, based on how they are presented in the retail establishment. Packaging and placement have an affect on whether a product is purchased.

All products are judged at the point of sale. Decisions to try and buy a particular good or service depends on the ability to weigh the merits of a product in three interrelated areas: Quality, Delivery, and Price. Sometimes the decision is seemingly clear-cut . . . with some offerings much brooding . . . but today many forces are at work to greatly complicate balancing the triad for the greatest satisfaction of the buyer. Whole classes of retail trade are disappearing, not to mention many well known products. To understand the opportunities of the future, it is helpful to look at the mutations of fair competition occurring at the present points of sale.

In the ultra competitive fields of conventional retailing and mass merchandising, forces have aligned to present a very challenging and unreasonable set of circumstances for both suppliers to retailers and the ultimate consumer or customer. A cadre of professional buyers employed throughout the retail sector are the gatekeepers between many noteworthy products and services and the useful and appropriate acceptance by would be consumers.

It used to be that the almost universal goal of successful retailers was to provide meaningfully differentiated solutions to consumer problems in the form of new and better products and services. Better was the focus of the three interrelated functions of the offerings: Quality, Delivery, and Price. The relative weighting of these variables were managed by the retail salesperson through working with the consumer to achieve a win-win transaction. The eyes and ears as well as the mouthpiece for these now old fashioned retail enterprises was the retail salesperson.

Staggering changes abound, besides the unreasonable hurdles for new products; there is now a displacement of tried and proven products and services along with many retail salespeople. There is a substitution of real value in products. There has been a steady increase toward excessively hyped and trendy products that often fall short in terms of meaningful features and benefits for the consumer. Instead of objective judgments, made by professional buyers, of the functional performance of products, retailers control distribution by corralling customers into believing contrived propositions based on marketing concepts known as Product Positioning. In this competitively driven but short-sighted view, artificial stratification of product quality is offered to the consumer. Product Positioning can rely on perceptions only: Perceived High Quality, Perceived Medium Quality, and Perceived Low Quality. These perceptions are seeded with Publicity and Advertising and sometimes reinforced at the Point-of-Sale with displays, contests, promotions, and graphics printed on the package itself.

On one level, the global level, it appears that the free market is still operating. But, consider that most traditional retailers in the U.S. have made that very explainable, but not appropriate, decision to "circle the wagons" and try to protect market share, as measured only in terms of dollars of sales, when faced with stiff competition. These retailers are trading the future profitability of their businesses in order to make present projections. As is readily apparent, even in the good economic conditions of the 1990's, retailers are still under siege. The "circle the wagons" strategy, complete with the downsizing of personnel in all departments (even Sales) and whacking away at inventory levels until the company is effectively selling out of an "empty wagon" is the reactive centerpiece of competitive U.S. retailers' behavior but, there are other more insidious (ominous) forces at work.

When in the 1980's, less competitive food retailers (competing in one of the most competitive business categories of all: grocery stores), became combined through mergers and acquisitions, they were folded into seemingly more profitable national chain stores. Local ties and obligations to ultimately provide the best products and services to consumers was no longer the driving force that rewarded adherent retailers with their share of the "American Dream". Unfortunately, some ties never existed in some locales (for reasons not discussed here) and this allowed a toe hold to some national "discounters" in regional markets. Nevertheless, obligations had previously existed in a general sense where free market forces were not being distorted. As expected, in any business, return on investment was important to the big chains. But, before there would be a real return on investment to newly consolidated chains, there would be huge issues of debt service that had to be addressed in order to pay the high rates of interest that came with the "junk" bonds.

"Junk bonds" squeezed the businesses and unethical business practices were formulated out of a combination of excessive greed and desperation. Disingenuous grocery managers, with their employees known to the trade as the Buyers, imposed "slotting fees" on suppliers as a way to generate excess cash. These fees are essentially corporate bribes. They were finally exposed in a very public way on CBS News 60 Minutes but, while terminologies are changing to stay ahead of enforceable legislation to placate angry consumers, the practice still very much exists. The chains purport to have to "set up" a product in their systems. Called a shelf rental fee by some; it is not truly a rental because it is of open ended duration, at the pleasure of the retailer, with no obligation for reimbursement to the supplier for early product eviction. In fact, some retailers have carried this so far as to also charge a deleting fee when a product is removed. One chain store, with over 100 stores based in Chicago, charges upwards of $3,000 for slotting just one SKU, stock keeping unit or style of a product, in its stores. The revenue gained this way, by ruthless chains, from suppliers is helping to pay off debt but, at a cost that is ultimately transferred to the consumer in the form of higher prices and less selection. And, normal competition, that would have kept quality levels spiraling upward, is stagnated as competitive new solutions to consumers' problems, in the form of better products, are not able to run the artificial financial gauntlet in this anti-competitive environment. It should be emphasized that the national cost to a supplier/producer to roll out just one SKU is now in the $2–3 million dollar range. This prohibits all but the largest suppliers from competing in the marketplace.

Advanced stages of slotting fee blight are apparent in the Snack Aisle and the Soft Drink Sections of the grocery stores. As a result, the most advanced effects of this flawed method, from the supplier and consumer point of view, can now be seen. Actual product diversification has narrowed substantially. Overall product breadth and competition from depth has been significantly reduced. There are many fewer manufacturers represented. Those big brand names that still survive have shifted to a predatory philosophy that has a parasitic basis made possible originally by the imposition of the retailers' slotting fees. Product line extensions, for the express purpose of taking up shelf space, have occurred in dramatic fashion. Mock brand proliferation to weed out independent producers is prominent. Caffeine free regular, caffeine free diet, diet, regular, new, clear, six pack 12 oz. cans, 12 pack 12 oz. cans, 24 count case pack cans, 6 pack 16 oz. plastic, 8 pack 16 oz. plastic, 2 liter plastic, 2 liter Double pack, 8 pack 20 oz., 6 pack nostalgic glass pack . . . all these pseudo-differentiated colas in one cola category! Yet over 50 percent of the population can't even distinguish the incrementally different tastes in all colas according to Dr. Charles Sing, Head of the Dept. of Human Genetics, University of Michigan. And, while people undoubtedly enjoyed the refreshingly differentiated tastes of: Green River™, Sun Drop™, a host of creme sodas, root beers, colas, orange and grape sodas, ginger ales, sarsaparilla and many regional pop drinks. . . . They are no longer easily obtained if available at all; they have been stratified out of existence. Essentially all the shelf space is spoken for and product categories of perceived High, Medium, and Low quality/cost are filled.

Meaningful product differentiations, when they still do exist in fact; or, are in turn deceitfully created through unethical false positioning, are nonetheless put to the test with all products and services that are always first and foremost judged at the point of sale. Secondary judgments that impact word of mouth advertising and repeat sales are affected by judgments at the point of use and beyond.

Intuitively, retailers have continued to put many products in as good a setting as possible. Dramatic display windows artfully decorated with merchandise, displays of many types including stand alone "in and out" shipper displays, even video kiosks have been employed as cost controlled augmentation to the rare presence of an actual sales person. But retailers are all affected by still other forces at work.

Higher costs are ultimately passed along to the consumer by the grocery chain (that were the result of slotting fees). In the soda pop section and snack aisle of a typical grocery chain store, oligopolistic pricing is also now apparent.

The market has partially responded to the problems that national grocery chains have created for its suppliers and customers. The mass merchandising discount chains have no slotting fees. They in turn can offer lower prices and they have done it. But, in order to push their price destruction strategy to the limit, they have also cut in store sales service staff to the bone. But, in the warehouse, it is often hard to adequately display the features and benefits of a particular product. Vast expanses of products can be housed in these stores. One example is the tire "canyon" section of many discount mass merchants like Wal*Mart. In these sections individual styles and sizes get lost. There is also a rather acrid smell or rubber. This retail space does not easily attract attention.

A film strip marketing apparatus known in the art is the Sportsman's Network Projector, manufactured by LaBelle Industries, Oconomowoc, Wis. This apparatus employs a 16 mm film strip coupled to a Lear 8-track audio tape. The Sportsman's Network Projector includes a seeing eye and starts a display of a sequence of pictures when the seeing eye detects the presence of a passer-by. These machines are not in wide use due, in part, to difficulty in being able to obtain the tapes or film strips used in such machines.

Popcorn vending apparatus are known in the art. See, for example, U.S. Pat. No. 4,171,667 to Miller et al., which is incorporated herein by reference, and U.S. Pat. No. 5,309,825 to Pinone, which is incorporated herein by reference. U.S. Pat. No. 5,020,688 to Power discloses a hot popcorn microwave vending machine, and is incorporated by reference.

Attention is directed to U.S. Pat. No. 3,884,386 to Urcola which discloses a device for automatically supplying drinks and foodstuff and which is incorporated herein by reference.

SUMMARY OF THE INVENTION

The invention employs an aromator to draw customers to a location in a retail establishment. The term "retail," as used herein, is intended to encompass all types of stores including stores that have warehouse concepts or that sell in large quantities.

The invention provides a marketing apparatus or system comprising a housing having the appearance of an antique jukebox; a display supported by the housing; an aromator supported by the housing and selectively emitting an aroma; and a motion sensor supported by the housing and triggering the display in response to sensing of motion.

In one embodiment, the housing has the appearance of a jukebox such as a Wurlitzer Model 1015. The housing includes a face having a bottom, opposite edges that are least partially columnar, and a downwardly facing arcuate surface extending between upper ends of the opposite edges. At least portions of the arcuate surface and columnar portion of the edges are translucent. In the illustrated embodiment, the housing further includes chase lights or bubble lights interior to and along the edges and the arcuate surface. In the illustrated embodiment, The housing further includes a second set of columnar and arcuate surfaces interior to and along the chase lights or bubble lights. A further set of chase lights or bubble lights is provided along and generally behind the first mentioned set of columnar surfaces and above the first mentioned arcuate surface. The appearance of a jukebox invokes images of fun or nostalgia to entice or attract customers' attention.

The marketing apparatus further includes, a video player connected to the display. For example, the video player can be a film player, a video cassette recorder, a laser disk player, a CD-ROM player, an 8 mm player, etc.

The marketing apparatus further includes a motion sensor supported by the housing and triggering the video player and display in response to motion being sensed.

The marketing apparatus includes an aromator supported by the housing. In one embodiment, the aromator prepares or holds an aromatic food such as popcorn, coffee, expresso, lattes, soups, baked goods, (e.g. cookies), fruits, juices, ciders (e.g., hot cider). In another embodiment, the aromator comprises a heater heating an aromatic solid (e.g. incense), an atomizer which atomizes a liquid or oil (e.g., a perfume, incense), a fan or venturi which vents an aromatic gas or which vents an aroma from a solid by passing air relative to the solid (e.g., relative to soaps, food items, incense, etc.). In one embodiment, the aromator comprises an apparatus including a slow motor or solenoid which periodically acts to depress the nozzle/actuator of an aerosol can.

The invention is embodied in a machine (a marketing system) that incorporates special display devices to aid in merchandising and promoting in a wide variety of retail locations. The invention is also useful in many other locations for support of commercial, governmental, educational, and entertainment uses.

The marketing system employs automatic and remote controlled stimulative aroma broadcasting and display devices integrated with internal and external multimedia storage and retrieval devices to provide a broad spectrum of entertainment and promotional support at the point of use. The present invention relates to integrated display devices and, in particular, to a new system of point of sale devices especially adapted for self-service food, beverage, merchandise, and service delivery devices including kiosks and vending machines. More particularly, the apparatus incorporates automatic and remote controlled audio/visual display systems that are easily adapted to aid in merchandising popcorn, beverages, or a wide array of aromatic foods and beverages, merchandise, and services. The opportunities are broad and embrace the disparate interests of the inventor who can envision, for example, merchandising, with this present invention, his CrabClaw Boat Anchor (™), disclosed in U.S. Pat. No. 4,602,588, as well as, a wide array of food products packaged in Microwave Cooking Container With Reflectors, disclosed in U.S. Pat. No. 5,468,939.

In one embodiment of the invention, when the apparatus is located out of the direct line of sight of the user, then the machine first attracts users with aromatic broadcasting of an aroma. When the user first encounters the machine's visual cues, in addition to providing an attractive display; the cues elicit a psycho-motor response which draws the consumer or user to the machine. Heightened olfactory, aural, and visual awareness causes an ambulatory response with increased psycho-motor activity levels causing the user to become aware of and then intensify interaction with this new machine. Then, the automatic consecutive cueing, by the machine, of more than one of the user's senses, maintains the user's attention. The aroma broadcasting features of this machine are unique and enrobe the other senses of the user and initial involuntary interactive behavior with associative possibilities.

Laboratory and field studies of a comprehensive nature have been carried out by Harvard Professor, Daniel L. Schacter, in the area of memory research that sheds a new understanding of the underlying functions of the brain in response to different cueing and priming routines. The operation of the invention and its interaction with the user is consistent with the powerful description of the brain's perceptual representation system, PRS, and the previously hidden world of implicit memory—when past experiences unconsciously influence a person's perceptions, thoughts, and actions, as discussed by both Schacter and Professor Endel Tulving of Harvard in a series of articles that, among other things, define the neuroanatomical correlates of memory for visual objects.

In Schacter's 1996 book, Searching for Memory, Schacter under girds the subjective pioneering work of Marcel Proust with hard science on how involuntary recollections can be revealed due to cueing from confrontations with particular sights and smells. Schacter quotes the renowned Proust scholar, Roger Shattuck; "Proust set about to make us see time. . . . Merely to remember something is meaningless unless the remembered image is combined with a moment in the present affording a view of the same object or objects. Like our eyes, our memories must see double; these two images then converge in our minds into a single heightened reality." Schacter explains that Proust's insight is that feelings of remembering result from a subtle interplay between past and present.

The machinery of the present invention is effective in deriving consensual sensory responses from the user, of the machine's aural and visual presentations. This is accomplished by first enrobing the senses of the user with an aroma to emphasize the intializing of involuntary interactions. Hardened consumers, in an explainable effort at self preservation, have erected barriers to communication. These barriers are the result of excessive disappointment in the marketplace, by consumers who have been disappointed in the overall shortfall in the appropriate delivery of goods and services at what they consider to be a fair price level. This new machine gets through to these tough customers by dovetailing an irresistible aroma to exciting presentations that can be customized and tailored by interactive sensors to be a more perfect match for a given audience. The presentations of product features and benefits are accomplished in a very effective way not known before. And, even more particularly, the new machine can be used for cross-merchandising and merchandising and for promotional support of other products and services. Because the user of the new machine must wait while their product or service is being prepared and dispensed to them; they are, in effect, a captive audience. Users of this new apparatus respond well even to the features and benefits presentation of a multi-faceted complex sale, that although they necessarily cover all relevant points, tend to overload the attention span of a control group of consumers that have not interacted with this machine.

Other features and advantages of the invention will become apparent to those of ordinary skill in the art upon review of the following detailed description, drawings, and claims.

DETAILED DESCRIPTION OF THE PREFERRED EMBODIMENTS

Figure 1:
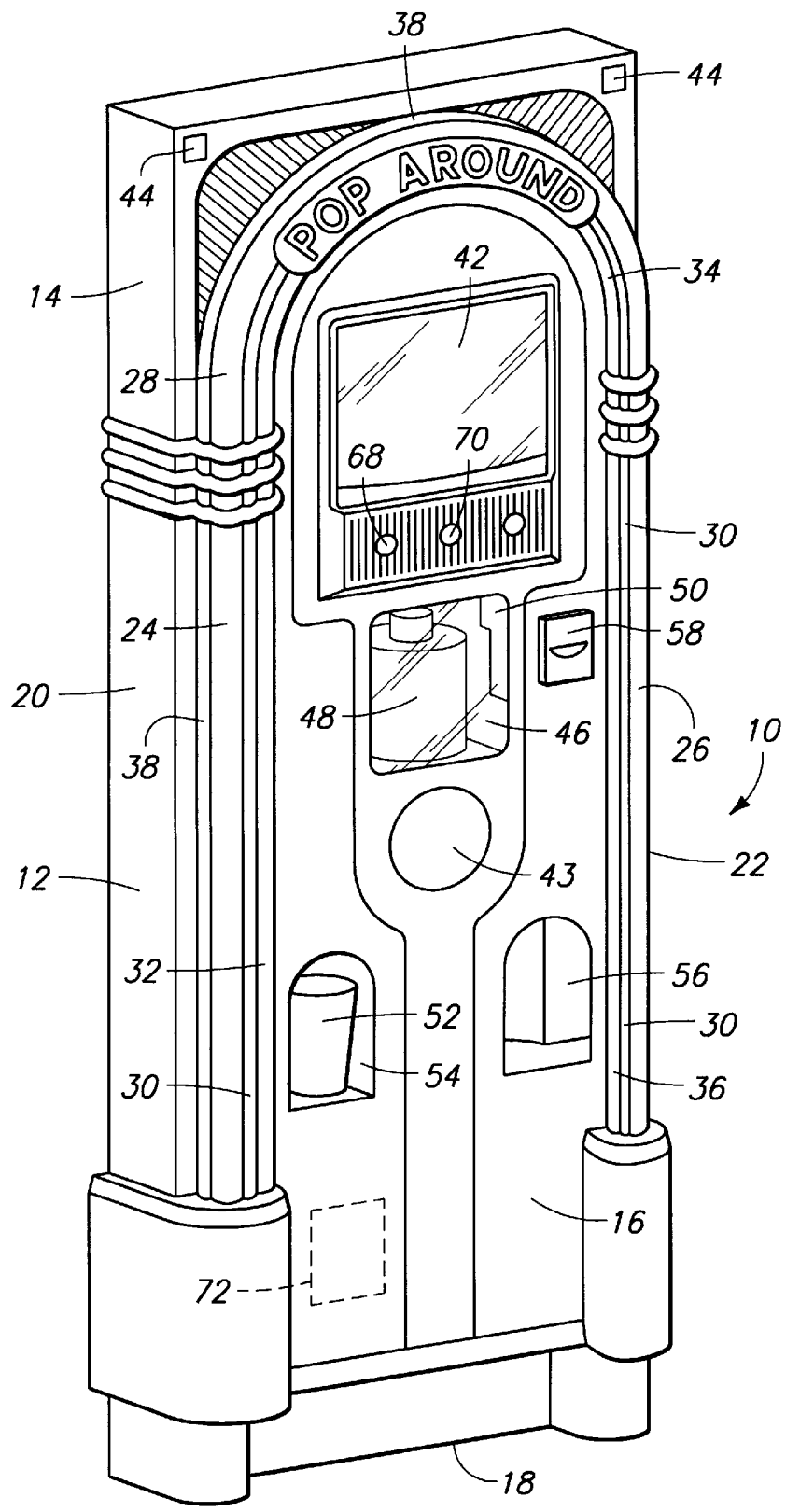
FIG. 1 is a perspective view showing the front of a marketing apparatus embodying the invention.

FIG. 1 shows a marketing apparatus 10 embodying the invention.

The marketing system 10 comprises a housing 12. In one embodiment, the housing 12 has the appearance of a jukebox such as a Wurlitzer Model 1015. The housing 12 includes a door 14 having a face 16. The face 16 includes a bottom 18, opposite edges 20 and 22 including generally semi-tubular molded or glass portions 24 and 26 that are least partially columnar, and has a downwardly facing arcuate semi-tubular molded or glass portion 28 extending between upper ends of the opposite edges. The portion 28 defines a multi-color rainbow arch. At least part of the arcuate surface and columnar portions 24 and 26 are translucent. In the illustrated embodiment, the housing further includes chase lights or bubble lights (e.g., bubbles formed in a lighted, liquid filled tube) 30 interior to and adjacent the portions 24, 26, and 28. In the illustrated embodiment, the housing further includes a second set of semi-tubular columnar and arcuate surfaces 32, 34, and 36 interior to and along the chase lights or bubble lights 30. A further set of chase lights or bubble lights 38 is provided along and generally behind the first mentioned set of columnar portions 24 and 26 and above the first mentioned arcuate portion 28. In a preferred embodiment, the portions 24, 26, 28, 32, 34, and 36 are formed of minimal molded translucent or clear pieces (e.g. a single piece, or up to three pieces depending on the capabilities of available molding equipment). In one embodiment, the chase or bubble lights 30 and 38 comprise neon or neon rope such as neon rope sold by Neon King Ltd., 234 Aberdeen Main Road, Aberdeen, Hong Kong. In the illustrated embodiment, the face of the door 14 is made of three molded pieces of Lexan(™), and the molded pieces have translucent paint sprayed thereon. The housing supports lights behind the semi-tubular portions of the molded pieces. In one embodiment, rotatable multicolor filters are mounted for rotation about tubular lighting elements supported in the housing (such as fluorescent tubes mounted in the housing 12). Wood trim or trip having the appearance of wood is also included on the face of the door 14 in the illustrated embodiment. The appearance of a jukebox invokes images of fun or nostalgia to entice or attract customers' attention.

The marketing apparatus further includes a video player 40 (see FIG. 30) connected to the display. In the illustrated embodiment, the video player 40 is supported in the housing 12. For example, the video player 40 can be a film player, a video cassette recorder, a laser disk player, a CD-ROM player, an 8 mm player, etc. In one preferred embodiment, the video player 40 is a full motion CD-ROM video player.

The marketing apparatus 10 further includes a display 42 supported by the door 14 and visible from outside the housing, from in front of the housing 12. The display 42 can comprise an LED or LCD display. In a preferred embodiment, however, the display 42 comprises a video monitor. In a more preferred embodiment, the display 42 comprises a 13 inch Sony Trinitron monitor.

The marketing apparatus 10 further includes a speaker 43 supported by the housing 12 and connected to the video player 40.

The marketing apparatus 10 further includes a sensor 44 supported by the housing 12 and triggering the video player 40, the display 42, and the speaker 43 in response to sensing of a person spaced apart but proximate to the housing 12. In one embodiment, the marketing apparatus 10 includes two sensors 44, one in each upper corner of the door 14. In one embodiment, one or both of the sensors 44 are heat sensors, and sense presence of a person by sensing heat. In another embodiment, the sensors 44 are infrared sensors. In a preferred embodiment, the sensors 44 are motion sensors. One example of a motion sensor 44 that could be adapted for use with, or employed in, the marketing apparatus 10 is the Superseller Model 44120.00 sold by Chips International Inc., Priddy, Tex. 76870. The Superseller includes a speaker which can be used as the speaker 43 if disconnected from an audio source contained in the Superseller and connected instead to the video player 40. In one embodiment, the display 42 shows a picture of a plurality of records, as would be arranged in a traditional jukebox, until one of the sensors 44 senses the presence of a nearby person. Then, the sensor 44 trigger the start of operation of the video player 40, and the display 42 shows a program played by the video player 40, and desired audio is started. The audio is preferably also generated by the video player 40, but could also be generated by a separate audio program source. Sensitivity of the sensors 44 can be adjusted as desired.

The marketing apparatus 10 includes an aromator 46 supported by the housing. In a preferred embodiment, the aromator 46 prepares or holds an aromatic food such as popcorn, coffee, expresso, lattes, soups, baked goods, (e.g. cookies), fruits, juices, ciders (e.g., hot cider). In another embodiment, the aromator comprises a heater heating an aromatic solid (e.g. incense), an atomizer which atomizes a liquid or oil (e.g., a perfume, incense), a fan or venturi which vents an aromatic gas or which vents an aroma from a solid by passing air relative to the solid (e.g., relative to soaps, food items, incense, etc.). In one embodiment, the aromator 46 comprises an apparatus including a slow motor or solenoid which periodically acts to depress the nozzle/actuator of an aerosol can.

In one embodiment, the aromator 46 comprises a dispenser of a food product. The term "food," as used herein, is intended to encompass beverages.

In the illustrated embodiment, the aromator 46 includes a popcorn popper supported by the housing. The aroma of popcorn draws shoppers to lower traffic areas of a retail establishment. In the illustrated embodiment, the popcorn popper includes a translucent popping chamber 48 visible from outside the housing 12. More particularly, the housing 12 includes a window, such as a glass or clear window 50 in the door 14. In the illustrated embodiment, the popping chamber 48 is formed of clear Pyrex (™). This allows a visual display of popcorn being popped, which captivates passers by while an advertisement is displayed on the display 42. The advertisement can, for example, advertise products located proximate or adjacent the marketing system 10. In one embodiment, the popping chamber 48 sits on an upwardly directed source 50 of hot air for hot air popping, receives unpopped kernels via a kernel receiving chute 64 of a popcorn kernel reservoir 66. The reservoir 66 is translatable horizontally forwardly for refilling (as is shown translated forwardly from its use position in FIG. 3). The popping chamber 48 upwardly expels popped popcorn (which overcomes gravity and is lifted by the air from the hot air source) and fills a cup 52. One example of such a hot air source 50 is a blower sold by Ametek Vacuum motor, Lamb Electric Division, Model 116305-00 (120 Volts). Techniques known in the art (e.g., including cup drop mechanisms such as those manufactured by Vendo Corporation of Fresno, Calif.) can be employed for dispensing cups 52 from stacks 53 of cups 52 to a dispensing area 54. In the illustrated embodiment, the cups are 46 ounce cups sold by Solo. Any size cups can be employed. Waxed cups are preferred, but not required.

In the illustrated embodiment (see FIG. 3) the housing 12 includes a cup dispensing mechanism 60 having an upper portion, and a lower portion lower portion closer to the door than the upper portion. The cup dispensing mechanism 60 is therefore angled to reduce clearance needed for dropping the cup 52 and therefore to increase the height of the dispensing area 54 off of the ground. The cup dispensing mechanism 60 supports a plurality of columns cups, and includes selectively rotatable spirals for translating columns of cups after a column has been exhausted. The upper end of the cup dispensing mechanism 60 pivots forwardly for selective refilling of columns of cups.

In the illustrated embodiment, popcorn is dispensed on one side of the housing, and another product is dispensed on the other side of the housing, to a dispensing area 56. Such product could be, for example, a beverage. If cold drinks are vended, conventional vending machine components can be employed, including a compressor for keeping the drinks cold. In one embodiment, heat produced by the compressor is used to pre-heat kernels of popcorn.

The marketing system 10 further comprises a payment receptacle 58, such as a coin or token mechanism, and/or dollar changer and/or magnetic stripe reader 58 supported by the housing 14. Popping of popcorn takes place in response to receipt of payment by the payment receptacle 58.

The marketing system 10 further comprises a keyboard 68 via which various selections can be made after payment is made with the payment receptacle 58. For example, in the illustrated embodiment, the keyboard 68 comprises a second surface printed polyester film membrane manufactured by W.H. Brady of Milwaukee, Wis. In the illustrated embodiment, the keyboard includes buttons 70 surrounded by indicia providing an appearance of bullseyes to attract attention. Such buttons can be employed to select, for example, butter, plain, or cheese popcorn, respectively.

In the illustrated embodiment, the housing 14 has external dimensions of 30 inches wide, 72 inches high, and approximately 30 inches deep.

In one embodiment, a few kernels are periodically popped, regardless of whether payment has been inserted in the payment receptacle 58. The few sacrificial kernels are sufficient to produce the aroma of popcorn to attract passing shoppers. In one embodiment, the housing further comprises a grinder 72 located under the dispensing area 54 to grind spilled popcorn as well as to grind popcorn generated by the sacrificial kernels.

In an alternative embodiment, an area visible through the window receives and effects popping of popcorn contained in a container such as that described in U.S. Pat. No. 5,468,939 to MacLean IV, and incorporated herein by reference.

Figure 2:
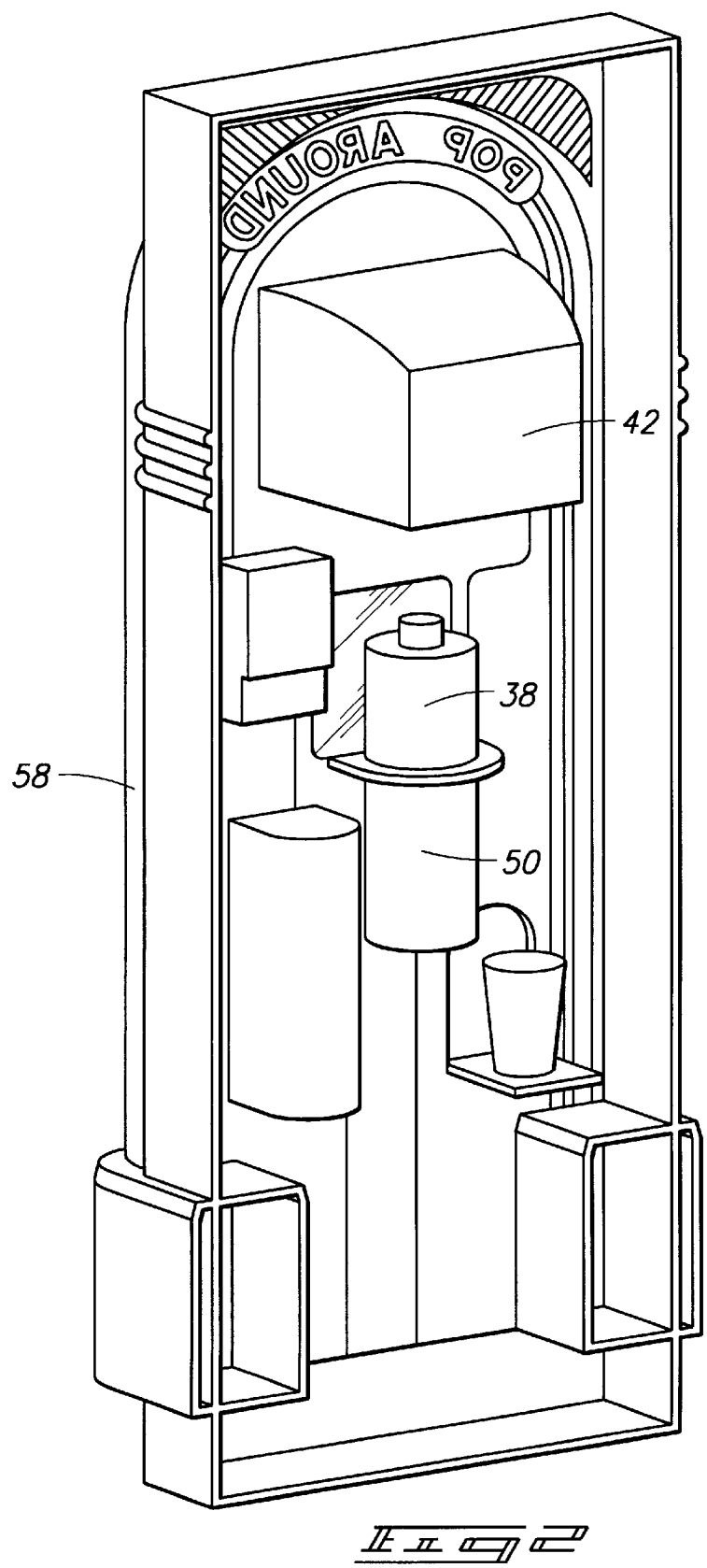
FIG. 2 is a perspective view showing the back of a door of the marketing apparatus of FIG. 1.

FIG. 2 illustrates that the payment receptacle 58, the monitor or display 42, the popping chamber 48, and the hot air source 50 are all supported by the door 14. This makes it easy to effect repairs by replacing the door 14 instead of having to remove the entire marketing system 10.

Figure 3:
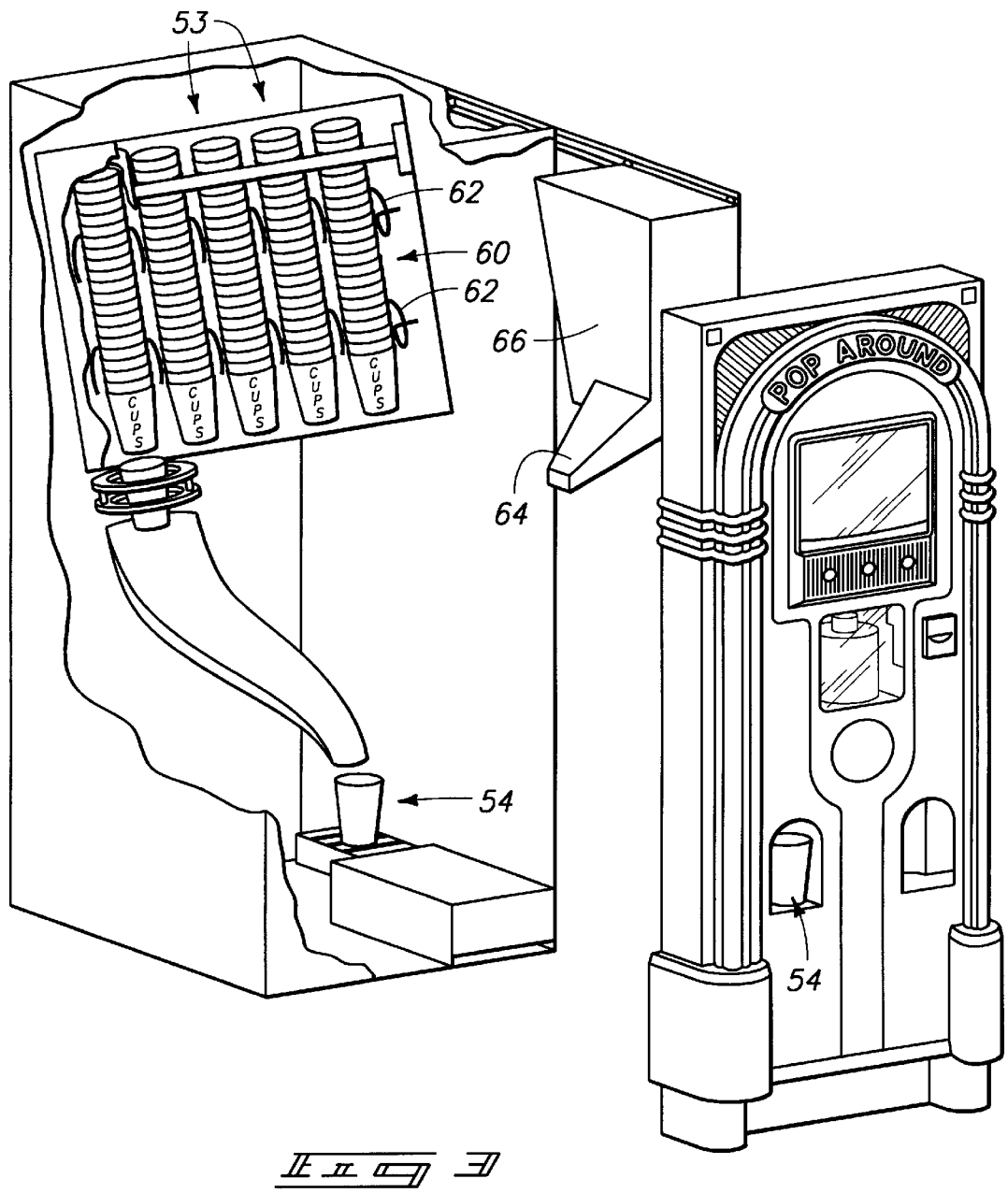
FIG. 3 is an exploded view illustrating the interior of the marketing apparatus of FIG. 1 as well as the door of the marketing apparatus of FIG. 1.

FIG. 3 illustrates a marketing system 100 similar to the marketing system 10, like reference numerals indicating like components, except that the marketing system 100 includes a microwave popcorn popper 102 instead of a hot air or oil based popcorn popper. In the illustrated embodiment, the microwave popcorn popper 102 includes a microphone used to determine when popping has stopped, and when microwaves should cease to be applied. In the illustrated embodiment, the microwave popcorn popper 102 is a Menumaster Micro-Popper (™) model MP-1.

Figure 4:
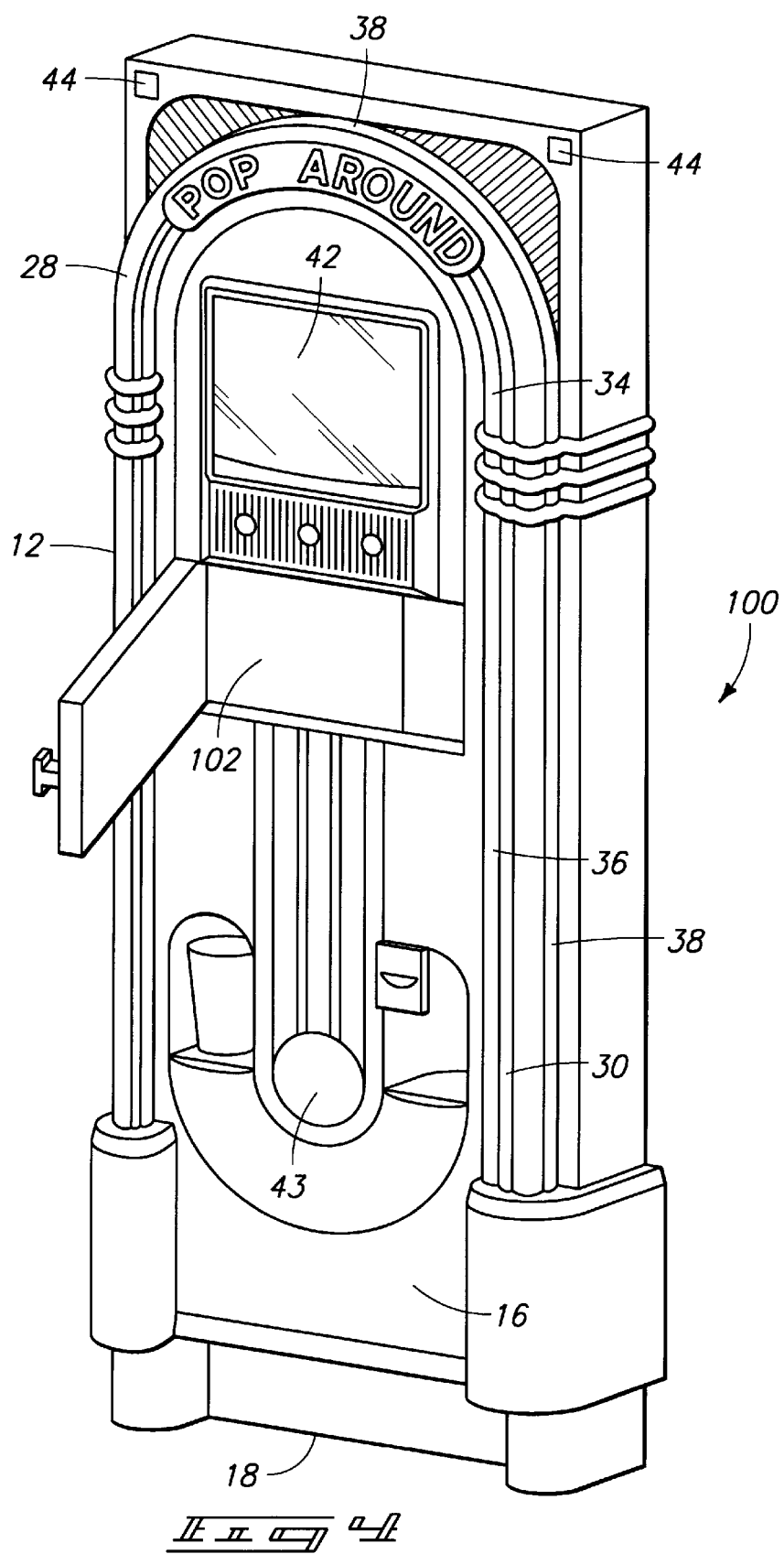
FIG. 4 is a perspective view showing the front of a marketing apparatus in accordance with an alternative embodiment of the invention.
Figure 5:
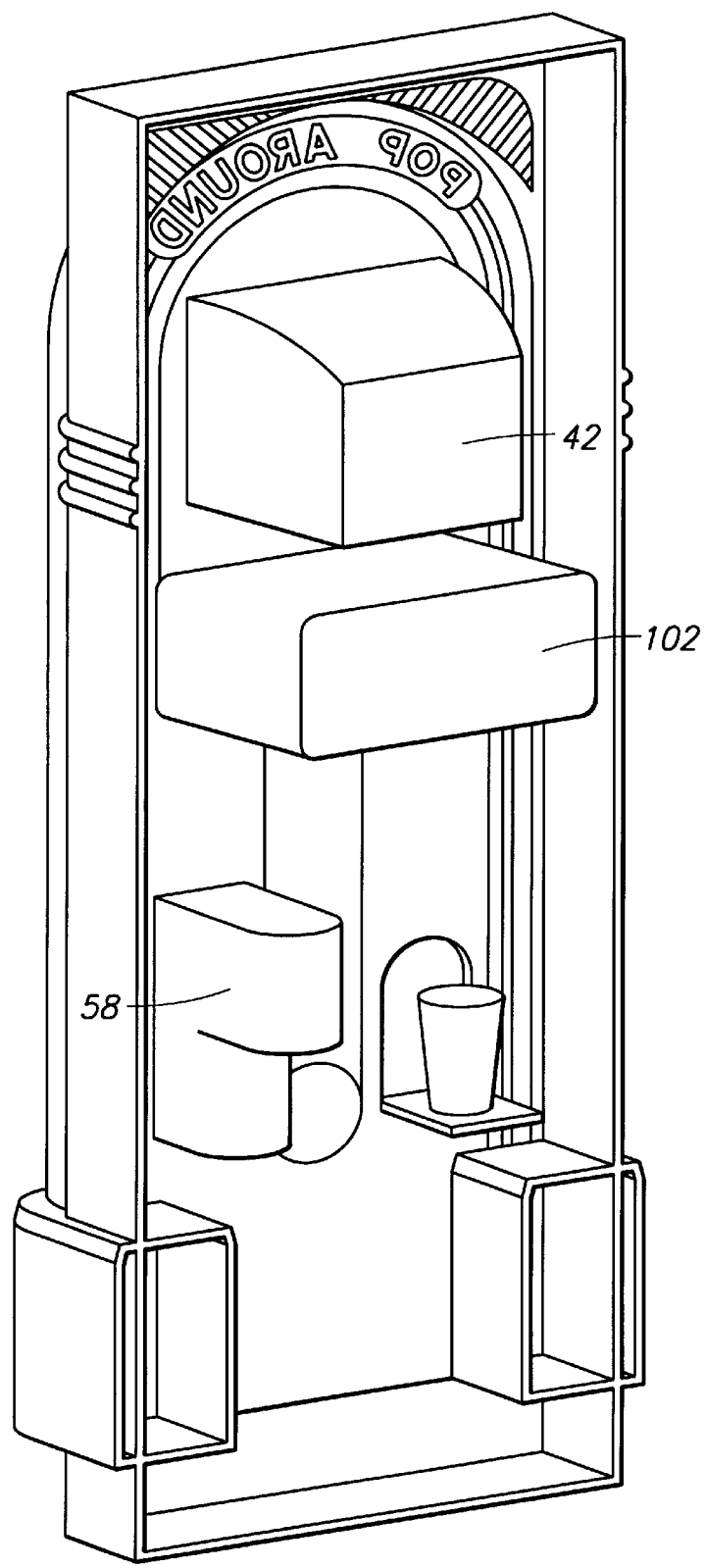
FIG. 5 is a perspective view showing the back of a door of the marketing apparatus of FIG. 4.

FIG. 4 illustrates that the payment receptacle 58, the monitor or display 42, the popping chamber 48, and the microwave popper 102 are all supported by the door 14. This makes it easy to effect repairs by replacing the door 14 instead of having to remove the entire marketing system 10.

The above description is provided to illustrate preferred embodiments of the invention. It is to be recognized that departures may be made therefrom within the scope of the invention, as defined by the appended claims and equivalents thereof. Obvious modifications will become apparent to those of ordinary skill in the art.

I claim:

1. A marketing apparatus comprising:
   a housing having a face including a bottom, having opposite edges including generally semi-tubular portions that are at least partially columnar, the opposite edges including upper ends, and the housing having a downwardly facing arcuate semi-tubular portion extending between the upper ends of the opposite edges;
   a display supported by the housing;
   an aromator supported by the housing and selectively emitting an aroma; and
   a sensor supported by the housing and triggering the display in response to sensing presence of a person spaced apart from but proximate the housing.

2. A marketing system in accordance with claim 1 and further comprising chase lights adjacent the semi-tubular portions.

3. A marketing apparatus in accordance with claim 1 and further comprising a video player supported by the housing and connected to the display, and wherein the sensor triggers the video player in response to sensing presence of a person.

4. A marketing apparatus in accordance with claim 3 wherein the video player comprises a CD-ROM player.

5. A marketing apparatus in accordance with claim 1 wherein the display is a video monitor which displays an image of records when the sensor does not sense the presence of a person, and which displays video played by the video player when the sensor senses the presence of a person.

6. A marketing apparatus in accordance with claim 3 and further comprising a speaker supported by the housing and connected to the video player.

7. A marketing apparatus in accordance with claim 1 wherein the aromator comprises a popcorn popper.

8. A marketing apparatus in accordance with claim 7 wherein the aromator comprises a hot air popcorn popper.

9. A marketing apparatus in accordance with claim 1 wherein the aromator comprises an apparatus dispensing a food product.

10. A marketing apparatus in accordance with claim 1 wherein the aromator comprises a popcorn popper and wherein popping of popcorn is visible from outside the housing.

11. A marketing apparatus in accordance with claim 10 and further comprising a payment receptacle, and wherein popping of popcorn is initiated in response to payment being received by the payment receptacle.

12. A marketing apparatus in accordance with claim 11 wherein the housing comprises an openable door, and wherein the display, the popcorn popper, and the payment receptacle are supported by the door and movable therewith.

13. A marketing apparatus in accordance with claim 11 and further comprising means for periodically popping sacrificial kernels of popcorn, regardless of whether payment has been inserted in the payment receptacle, to produce the aroma of popcorn to attract passing people.

14. A marketing apparatus in accordance with claim 13 wherein the housing further comprises a dispensing area, the marketing system further comprising a grinder supported by the housing under the dispensing area which grinds the sacrificial kernels and spilled popcorn.

15. A marketing apparatus comprising:
   a housing including a downwardly directed multi-color arch;
   a display supported by the housing;
   a video player connected to the display;
   a motion sensor supported by the housing and triggering the video player and display in response to motion being sensed; and a popcorn popper supported by the housing and including a translucent popping chamber, the housing including a window facing the popping chamber.

16. A marketing apparatus in accordance with claim 15 wherein the housing comprises a face including a bottom, including opposite edges having generally semi-tubular portions that are at least partially columnar, and wherein the arch comprises a downwardly facing arcuate semi-tubular portion extending between upper ends of the opposite edges, and wherein the marketing apparatus further comprises chase lights adjacent the semi-tubular portions.

17. A marketing apparatus in accordance with claim 15 and further comprising a video player supported by the housing and connected to the display, and wherein the sensor triggers the video player in response to sensing presence of a person.

18. A marketing apparatus in accordance with claim 15 wherein the aromator comprises an apparatus dispensing a food product.

19. A marketing apparatus comprising:

a housing;

a display supported by the housing;

a video player connected to the display;

a motion sensor supported by the housing and triggering the video player and display in response to motion being sensed;

a popcorn popper supported by the housing and including a translucent popping chamber, the housing including a window facing the popping chamber; and a payment receptacle, and wherein popping of popcorn is initiated in response to payment being received by the payment receptacle; wherein a few sacrificial kernels of popcorn are periodically popped, regardless of whether payment has been inserted in the payment receptacle to produce the aroma of popcorn to attract passing people.

20. A marketing apparatus comprising:

a housing;

a display supported by the housing;

a video player connected to the display, the sensor triggering the video player in response to sensing presence of a person;

an aromator supported by the housing and selectively emitting an aroma; and a sensor supported by the housing and triggering the display in response to sensing presence of a person spaced apart from but proximate the housing.

\* \* \* \* \*